United States Patent
Abrol et al.

(10) Patent No.: US 9,420,332 B2
(45) Date of Patent: Aug. 16, 2016

(54) CLOCK COMPENSATION TECHNIQUES FOR AUDIO DECODING

(75) Inventors: Nischal Abrol, San Diego, CA (US); Sivaramakrishna Veerepalli, San Diego, CA (US); Stephen Verrall, Encinitas, CA (US); Sandeep Singhai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1780 days.

(21) Appl. No.: 11/691,688

(22) Filed: Mar. 27, 2007

(65) Prior Publication Data

US 2008/0008281 A1 Jan. 10, 2008

Related U.S. Application Data

(60) Provisional application No. 60/819,313, filed on Jul. 6, 2006.

(51) Int. Cl.
*G06F 17/00* (2006.01)
*H04N 21/439* (2011.01)
*G10L 21/01* (2013.01)
(Continued)

(52) U.S. Cl.
CPC ............ *H04N 21/439* (2013.01); *G10L 21/01* (2013.01); *H04J 3/0632* (2013.01); *H04N 21/2368* (2013.01); *H04N 21/4305* (2013.01);
(Continued)

(58) Field of Classification Search
CPC ............ H04N 21/439; H04N 21/2368; H04N 21/4305; H04N 21/4307; H04N 21/4341; H04N 21/4398; G10L 21/01; H04J 3/0632

USPC ............................................. 700/94; 375/359
See application file for complete search history.

(56) References Cited

U.S. PATENT DOCUMENTS

| 5,512,851 | A | * | 4/1996 | Clarke | .......................... 327/144 |
| 5,594,660 | A | * | 1/1997 | Sung | ...................... G09G 5/393 |
| | | | | | 375/E7.093 |

(Continued)

FOREIGN PATENT DOCUMENTS

| EP | 0743773 | 11/1966 |
| JP | 62278600 | 12/1987 |

(Continued)

OTHER PUBLICATIONS

WIPO Documents EP0921666; published 1999.*

(Continued)

*Primary Examiner* — Paul McCord
(74) *Attorney, Agent, or Firm* — Heejong Yoo

(57) ABSTRACT

This disclosure describes audio decoding techniques for decoding audio information that needs to be properly clocked. In accordance with this disclosure, the number of audio samples in decoded audio output can be adjusted to compensate for an estimated error the in decoder clock. That is to say, rather than adjust the decoder clock to synchronize the decoder clock to the encoder clock, this disclosure proposes adding or removing audio samples from the decoded audio output in order to ensure that the decoded audio output is properly timed. In this way, the techniques of this disclosure can eliminate the need for an adjustable or controllable clock at the decoding device, which can save cost and/or allow legacy devices that do not include an adjustable or controllable clock to decode and output audio information that needs to be properly clocked.

38 Claims, 5 Drawing Sheets

(51) Int. Cl.
*H04J 3/06* (2006.01)
*H04N 21/2368* (2011.01)
*H04N 21/43* (2011.01)
*H04N 21/434* (2011.01)

(52) U.S. Cl.
CPC ....... *H04N21/4307* (2013.01); *H04N 21/4341* (2013.01); *H04N 21/4398* (2013.01)

(56) References Cited

U.S. PATENT DOCUMENTS

| | | | | |
|---|---|---|---|---|
| 5,596,294 | A * | 1/1997 | Kadomaru et al. | 327/145 |
| 5,596,420 | A * | 1/1997 | Daum | G09G 5/393 348/515 |
| 5,598,352 | A * | 1/1997 | Rosenau | G09G 5/393 348/512 |
| 5,859,872 | A * | 1/1999 | Townshend | H04L 5/1438 370/523 |
| 5,905,768 | A * | 5/1999 | Maturi | H04N 21/4341 370/509 |
| 5,926,767 | A * | 7/1999 | Olds et al. | 455/504 |
| 6,018,376 | A * | 1/2000 | Nakatani | 375/240.28 |
| 6,101,196 | A * | 8/2000 | Murakami | 370/516 |
| 6,181,712 | B1 | 1/2001 | Rosengren | |
| 6,195,403 | B1 * | 2/2001 | Anderson | H04N 21/2368 348/512 |
| 6,259,677 | B1 | 7/2001 | Jain | |
| 6,429,902 | B1 * | 8/2002 | Har-Chen | H04N 5/04 348/464 |
| 6,473,439 | B1 * | 10/2002 | Zerbe et al. | 370/503 |
| 6,487,672 | B1 * | 11/2002 | Byrne et al. | 713/400 |
| 6,493,163 | B1 * | 12/2002 | Reed et al. | 360/51 |
| 6,598,172 | B1 * | 7/2003 | VanDeusen | H04J 3/0632 370/389 |
| 6,760,391 | B1 * | 7/2004 | Alb et al. | 375/354 |
| 6,937,988 | B1 | 8/2005 | Hemkumar et al. | |
| 7,020,791 | B1 * | 3/2006 | Aweya et al. | 713/400 |
| 7,319,703 | B2 * | 1/2008 | Lakaniemi et al. | 370/505 |
| 7,394,833 | B2 * | 7/2008 | Heikkinen et al. | 370/516 |
| 7,418,013 | B2 * | 8/2008 | Lam | 370/516 |
| 7,519,845 | B2 * | 4/2009 | Chen | 713/500 |
| 7,532,612 | B2 * | 5/2009 | Lakaniemi et al. | 370/350 |
| 7,570,304 | B1 * | 8/2009 | Trinh et al. | 348/512 |
| 7,634,227 | B2 * | 12/2009 | de Jong | 455/3.06 |
| 7,672,742 | B2 * | 3/2010 | Ng et al. | 700/94 |
| 2002/0024970 | A1 * | 2/2002 | Amaral et al. | 370/468 |
| 2002/0126782 | A1 * | 9/2002 | Rotsch et al. | 375/362 |
| 2002/0128822 | A1 * | 9/2002 | Kahn | G10L 21/01 704/200.1 |
| 2003/0045957 | A1 * | 3/2003 | Haberman | G11B 27/034 700/94 |
| 2003/0174734 | A1 * | 9/2003 | Compton et al. | 370/503 |
| 2003/0223392 | A1 * | 12/2003 | Iancu | 370/335 |
| 2004/0078828 | A1 * | 4/2004 | Parchman | H04N 21/235 725/135 |
| 2004/0210329 | A1 * | 10/2004 | Chen et al. | 700/94 |
| 2005/0049806 | A1 * | 3/2005 | Premerlani | 702/64 |
| 2005/0234571 | A1 * | 10/2005 | Holmes | 700/94 |
| 2005/0261790 | A1 * | 11/2005 | Park et al. | 700/94 |
| 2006/0120499 | A1 * | 6/2006 | Simmons et al. | 375/368 |
| 2006/0136768 | A1 * | 6/2006 | Liu et al. | 713/400 |
| 2006/0146185 | A1 * | 7/2006 | Chen | 348/410.1 |
| 2006/0164266 | A1 * | 7/2006 | Riedel et al. | 341/50 |
| 2006/0182002 | A1 * | 8/2006 | Ryu et al. | 369/124.01 |
| 2006/0268965 | A1 * | 11/2006 | Ibrahim et al. | 375/149 |
| 2007/0009071 | A1 * | 1/2007 | Singh | H04J 3/0632 375/354 |
| 2007/0041324 | A1 * | 2/2007 | Shenoi | 370/235 |
| 2008/0019398 | A1 * | 1/2008 | Genossar et al. | 370/498 |
| 2008/0085124 | A1 * | 4/2008 | Leung | H04N 21/2368 398/155 |
| 2008/0275709 | A1 * | 11/2008 | Den Brinker et al. | 704/500 |
| 2008/0304571 | A1 | 12/2008 | Tsukagoshi et al. | |
| 2008/0304810 | A1 * | 12/2008 | Rijckaert et al. | 386/68 |
| 2008/0310860 | A1 * | 12/2008 | Domagala et al. | 398/202 |
| 2012/0144228 | A1 * | 6/2012 | Howarth et al. | 714/3 |

FOREIGN PATENT DOCUMENTS

| | | |
|---|---|---|
| JP | 2002271397 | 9/2002 |
| WO | WO0111832 A1 | 2/2001 |
| WO | 0167436 A1 | 9/2001 |
| WO | 03021830 | 3/2003 |
| WO | WO-2005029869 A1 | 3/2005 |
| WO | WO2006025584 A1 | 3/2006 |

OTHER PUBLICATIONS

International Search Report PCT/US07/072980—International Search Authority—European Patent Office—Jan. 24, 2008.
International Preliminary Report on Patentability—PCT/US07/072980. International Search Authority—The International Bureau of WIPO—Geneva, Swtizerland—Jan. 6, 2009.
Written Opinion—PCT/US07/072980—International Search Authority—European Patent Office—Jan. 24, 2008.

* cited by examiner

CLOCK COMPENSATION TECHNIQUES FOR AUDIO DECODING

This application claims the benefit of U.S. Provisional Application 60/819,313, filed Jul. 6, 2006, the entire content of which is incorporated herein by reference.

TECHNICAL FIELD

This disclosure relates to audio decoding techniques and, more particularly, audio decoding techniques for audio information that includes clock signals from an audio encoder.

BACKGROUND

Audio coding is used in many applications and environments such as satellite radio, digital radio, internet streaming (web radio), digital music players, wireless mobile devices, and a variety of mobile multimedia applications. There are many audio coding standards, such as standards according to the motion pictures expert group (MPEG) including MPEG-2 and MPEG-4, standards according to the International Telecommunications Union (ITU), windows media audio (WMA) standards, and standards by Dolby Laboratories, Inc. Many audio coding standards also exist, including the MP3 standard and successors to the MP3 standard, such as the advanced audio coding (AAC) standard used in "iPod" devices sold by Apple Computer, Inc. Audio coding standards generally seek to achieve low bitrate, high quality audio coding using compression. Some audio coding is "loss-less," meaning that the coding does not degrade the audio signal, while other audio coding may introduce some loss in order to achieve additional compression.

In many applications, audio coding is used along with video coding in order to provide multi-media content for applications such as video telephony (VT) or streaming video. Audio coding is also commonly used in mobile devices that support multimedia applications such as video games, and the like. Indeed, mobile devices increasingly incorporate a wide variety of functionality and content that provides audio output to a user, and therefore makes use of audio coding techniques. Audio and video information may be segmented into frames or packets, which comprise blocks of audio and video data. A stream of audio output can be transmitted as a sequence of audio frames or packets, and then decoded to provide audio output to users.

Audio coding is also used in audio broadcasting or multimedia broadcasting. Multimedia broadcasting, for example, may use Enhanced H.264 video coding for delivering real-time video services in terrestrial mobile multimedia multicast (TM3) systems. Such TM3 systems may use the Forward Link Only (FLO) Air Interface Specification, "Forward Link Only Air Interface Specification for Terrestrial Mobile Multimedia Multicast," to be published as Technical Standard TIA-1099 (the "FLO Specification"). Other types of multimedia broadcasting standards and techniques also exist including future standards and techniques that may emerge or evolve.

Many audio streams carry clock signals from the encoder. In this case, the encoder provides clock signals in the audio stream that can be used by the decoder to ensure that timing of audio output is correct. The clock signals, for example, may be used to adjust a local clock at the decoder so that the decoder is clocked at the same rate as the encoder, thereby avoiding problems or errors in the timing of audio output. Audio streams that carry clock signals include audio packet streams that use the MPEG-2 Systems Transport Stream defined e.g., in ISO/IEC 138181-1. Many other examples of audio streams that carry clock signals may also exist, including future techniques that may emerge or evolve.

SUMMARY

In general, this disclosure describes audio decoding techniques for decoding audio information that needs to be properly clocked. An encoding device may generate and include first timing information within encoded audio information. The first timing information is associated with an encoder clock of the encoding device used to encode the audio information. A decoding device generates second timing information for the audio information based on a decoder clock. Differences between the first and second timing information can be used to estimate error in the decoder clock relative to the encoder clock.

In accordance with this disclosure, the number of audio samples in decoded audio output can be adjusted to compensate for the estimated error the in decoder clock. That is to say, rather than adjust the decoder clock to synchronize the decoder clock to the encoder clock, this disclosure proposes adding or removing audio samples from the decoded audio output in order to ensure that the decoded audio output is properly timed. In this way, the techniques of this disclosure can eliminate the need for an adjustable or controllable clock at the decoding device, which can save cost. In addition, this disclosure can allow legacy devices that do not include an adjustable or controllable clock to decode and output audio information that needs to be properly clocked. By inserting or deleting audio samples, an adjustable clocking effect can be achieved without the use of an adjustable clock. Various additional techniques are also described that can improve the addition or deletion of audio samples, such as techniques that estimate periods of substantial silence in the decoded audio output and preferentially insert or delete samples during such periods of substantial silence.

In one aspect, this disclosure provides a method comprising receiving audio information that includes first timing information associated with an encoder clock, generating second timing information for the audio information based on a decoder clock, estimating error in the decoder clock relative to the encoder clock based on a difference between the first timing information and the second timing information, decoding the audio information to generate audio samples, and adjusting a number of the audio samples in decoded audio output to compensate for the estimated error in the decoder clock.

In another aspect, this disclosure provides a device comprising a receiver that receives audio information including first timing information associated with an encoder clock, a decoder clock that generates second timing information for the audio information, a timing adjustment unit that estimates error in the decoder clock relative to the encoder clock based on a difference between the first timing information and the second timing information, and a decoder unit that decodes the audio information to generate audio samples, wherein the decoder unit adjusts a number of the audio samples in decoded audio output to compensate for the estimated error in the decoder clock.

In another aspect, this disclosure provides a device comprising means for receiving audio information that includes first timing information associated with an encoder clock, means for generating second timing information for the audio information based on a decoder clock, means for estimating error in the decoder clock relative to the encoder clock based on a difference between the first timing information and the second timing information, means for decoding the audio information to generate audio samples, and means for adjusting a number of the audio samples in decoded audio output to compensate for the estimated error in the decoder clock.

The techniques described in this disclosure may be implemented in hardware, software, firmware, or any combination thereof. If implemented in software, the software may be executed in a digital signal processor (DSP) or other type of processor. The software that executes the techniques may be initially stored in a machine-readable medium and loaded and executed in the processor.

Accordingly, this disclosure also contemplates a computer readable medium comprising instructions that upon execution in a device cause the device to receive audio information that includes first timing information associated with an encoder clock, generate second timing information for the audio information based on a decoder clock, estimate error in the decoder clock relative to the encoder clock based on a difference between the first timing information and the second timing information, decode the audio information to generate audio samples, and adjust a number of the audio samples in decoded audio output to compensate for the estimated error in the decoder clock.

Additional details of various aspects and examples of the techniques described in this disclosure are set forth in the accompanying drawings and the description below. Other features, objects and advantages of the techniques described herein will become apparent from the description and drawings, and from the claims.

DETAILED DESCRIPTION

This disclosure describes audio decoding techniques for decoding audio information that needs to be properly clocked. An encoding device may insert first timing information within encoded audio information. The first timing information, for example, may comprise time stamps added to an encoded stream of audio packets by the encoding device. Each successive time stamp is applied by the encoding device in defined increments of time, such as in 100 millisecond increments, as defined by the encoder clock.

When the decoding device receives the audio information, it generates second timing information for the audio information based on a decoder clock. In particular, the decoding device may generate its own time stamps based on its clock as the audio information is received by the decoding device. Differences between the first and second timing information can be used to estimate error in the decoder clock relative to the encoder clock. In particular, the difference in time between two adjacent time stamps as applied by the encoder and independently applied by the decoder can define an error in the decoder clock relative to the encoder clock. Filtering and averaging techniques may be used to account for any jitter in the respective clocks.

In accordance with this disclosure, the number of audio samples in decoded audio output can be adjusted to compensate for the estimated error the in decoder clock. That is to say, rather than adjust the decoder clock to synchronize the decoder clock to the encoder clock, audio samples are added or removed from the decoded audio output in order to ensure that the decoded audio output is properly timed. In this way, the techniques of this disclosure can eliminate the need for an adjustable or controllable clock at the decoding device, which can save cost. In addition, the techniques of this disclosure can allow legacy devices that do not include an adjustable or controllable clock to decode and output audio information that needs to be properly clocked. By inserting or deleting audio samples, an adjustable clocking effect can be achieved without the use of an adjustable clock. Additional techniques are also described that can improve the addition or deletion of audio samples, such as techniques that estimate periods of substantial silence in the decoded audio output and preferentially insert or delete samples during such periods of substantial silence.

Figure 1:
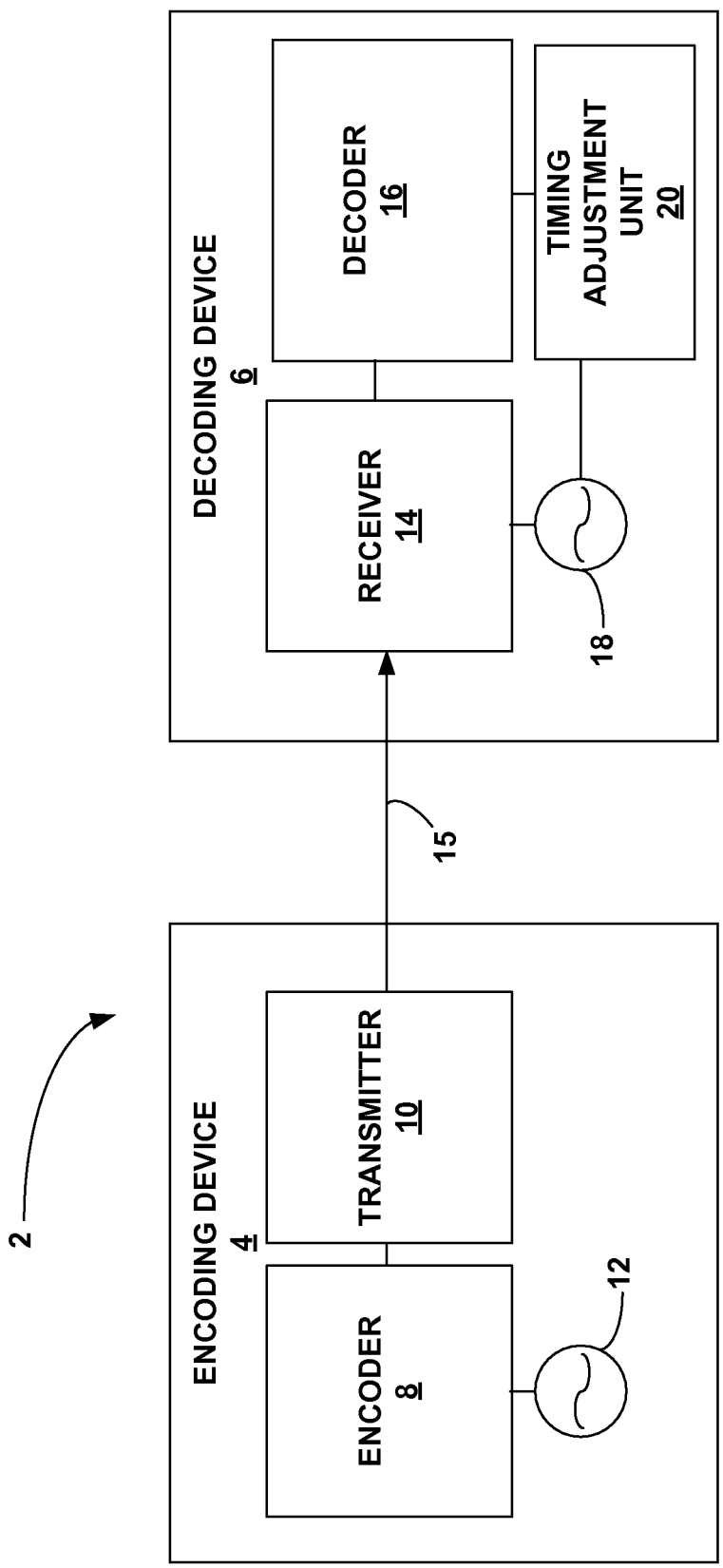
FIG. 1 is a block diagram illustrating a system that may use the clock compensation techniques of this disclosure.

FIG. 1 is a block diagram illustrating a system 2 that may use the techniques described herein. As shown in FIG. 1, system 2 includes an encoding device 4 that codes and transmits audio information to decoding device 6 via a transmission channel 15. Encoding device 4 and decoding device 6 may support one-way communication of audio information or multimedia information that includes both audio and video information. Alternatively, encoding device 4 and decoding device 6 may include reciprocal components to support two-way communication of audio or multimedia information. Transmission channel 15 may be a wired or wireless communication medium, or any combination of wired or wireless media.

Encoding device 4, for example, may form part of a broadcast network device used to broadcast one or more channels of audio information or multimedia information to wireless subscriber devices. In this case, encoding device 2 may transmit several channels of audio information or multimedia information to several decoding devices (i.e., many subscribers of the broadcast service). A single decoding device 6, however, is illustrated in FIG. 1 for simplicity. Encoding device 4 and decoding device 6 may be implemented as one or more processors, digital signal processors, application specific integrated circuits (ASICs), field programmable gate arrays (FPGAs), discrete logic, software, hardware, firmware, or any combinations thereof.

Examples of encoding device 4 may include wireless base stations or any infrastructure node used to broadcast the encoded audio information. Decoding device 6, on the other hand, may comprise a user device that receives the encoded audio information. By way of example, decoding device 6 may be implemented as part of a digital television, a wireless communication device, a portable digital assistant (PDA), a laptop computer or desktop computer, a digital music and video device, such as those sold under the trademark "iPod," a video gaming device, or a radiotelephone such as cellular, satellite or terrestrial-based radiotelephone. In other examples, both encoding device 4 and video decoding device 6 may comprise user devices, which communicate audio information between such devices via wireless telephony, data protocols, or the like.

The components described herein are exemplary of those applicable to implementation of the techniques described herein, although encoding device 4 and decoding device 6 may include many other components, if desired. Moreover, the techniques of this disclosure are not necessarily limited to use in a system like that of system 2, nor a broadcast system. The techniques may find application in any audio coding environment in which the audio information is clocked.

Encoding device 4 includes an encoder 8 that codes audio information, and a transmitter 10 that transmits the encoded audio information to decoding device 6 over communication channel 15. Encoding device 8 also includes an encoder clock 12. Encoding device 4 may insert first timing information within encoded audio information. The first timing information, for example, may comprise time stamps added to an encoded stream of audio packets by encoding device 4. Each successive time stamp is applied by the encoding device in defined increments of time, such as in 100 millisecond increments, as defined by encoder clock 12.

Decoding device 6 includes a receiver 14 that receives the encoded audio information and a decoder 16 that decodes the audio information for presentation to a user. Decoding device 6 also includes a decoder clock 18 and a timing adjustment unit 20.

When decoding device 6 receives the audio information, it generates second timing information for the audio information based on a decoder clock 18. In particular, decoding device 6 may generate its own time stamps based on decoder clock 18 as the audio information is received. Timing adjustment unit 20 calculates differences between the first and second timing information, and uses these calculations to estimate error in decoder clock 18 relative to encoder clock 12. In particular, timing adjustment unit 20 calculates the difference in time between two adjacent time stamps as applied by encoding device 4 and independently applied by decoding device 6 in order to define an error in decoder clock 18 relative to encoder clock 12. Various filtering and averaging techniques may be used to account for any jitter in the respective clocks.

In accordance with this disclosure, decoder 16 of decoding device 6 adjusts the number of audio samples in decoded audio output to compensate for the estimated error the in decoder clock. In other words, rather than adjust decoder clock 18 to synchronize decoder clock 18 to encoder clock 12, decoder 16 adds or removes audio samples from the decoded audio output in order to ensure that the decoded audio output is properly timed. In this way, the techniques of this disclosure can eliminate the need for decoder clock 18 to be adjustable or controllable, which can save cost. In addition, the techniques of this disclosure can allow legacy devices that do not include an adjustable or controllable clock to decode and output audio information that needs to be properly clocked. By inserting or deleting audio samples, decoding device 6 effectuates proper timing in the audio output without the use of an adjustable clock.

As described in greater detail below, additional techniques can also be used to improve the addition or deletion of audio samples by decoder 16. For example, decoder 16 may estimate periods of substantial silence in the decoded audio output and preferentially insert or delete samples during such periods of substantial silence. As an added advantage, the techniques may also compensate for any inherent delay that occurs due to audio processing by the various components of decoding device 6.

The techniques described herein may work with any audio streams that carry clock signals. One example is audio packet streams that use the MPEG-2 Systems Transport Stream defined e.g., in ISO/IEC 138181-1. Many other examples of audio streams that carry clock signals may also exist, including future techniques that may emerge or evolve. The techniques described herein may apply to any audio streams that carry clock signals, including the MPEG-2 Systems Transport Stream or other audio streams.

ISDBT-T (Integrated Services Digital Broadcasting-Terrestrial), SDMB (Satellite Digital Multimedia Broadcasting), and TDMB (Terrestrial Digital Multimedia Broadcasting) all use MPEG-2 Systems multiplexing. One example of MPEG-2 Systems multiplexing is described in ISO/IEC 13818-1, which is also referred to in ITU-T Recommendation H.222.0, entitled "Generic coding of moving pictures and associated audio information: Systems", October 2000. ISO stands for International Organization for Standardization, and IEC stands for the International Electrotechnical Commission. In MPEG-2, elementary streams delivered by audio and video encoders are packetized and multiplexed with program information (PMT) to form a program transport stream (TS). Multiple program transport streams are multiplexed with the program table (PAT) to form a system TS. Such multiplexing may be included as part of encoder 8 or transmitter 10 of encoding device 4.

As an example, an MPEG-2 TS may comprise 188 byte TS packets where each TS packet has a 4 byte header and a 184 byte payload. TS packet payloads may contain Packetized Elementary Streams (PES), typically comprising audio and video and program information (PMT). Some TS packets may contain an optional adaptation field whose size is determined by flags in the packet header. Adaptation fields may include timing information, pad bytes and other data.

The TS packet header starts with a synchronization byte and includes the Packet Identifier (PID). The PID identifies a particular PES within the multiplex. A PID value of zero is reserved for the PAT. A PAT is a table that associates a PID value with a PMT for every program in the TS. The PMT contains details of the constituent elementary streams for the program.

Referring again to FIG. 1, for an MPEG-2 TS or other transport streams that included multiplexed channels, receiver 14 of decoding device 6 may include a demultiplexer (not shown) to facilitate reception and identification of a channel of interest. In this case, when the demultiplexer is informed that a program has been selected (say program p), it can use the PAT to determine the PID of the PMT for program p. The demultiplexer then uses the PMT for program p to determine the PIDs of the elementary audio and video streams. The demultiplexer reads all packets in the TS and accepts only those which have the PIDs it is looking for (i.e. those associated with program p).

The use of clock references and time stamps are common in MPEG-2 transport streams, but may also be used in many other systems or protocols. In general, the programs contained in a transport stream originate from different locations and are asynchronous. Therefore MPEG-2 provides a mechanism to enable the decoder clock to synchronize to the encoder clock on a per-program basis. This synchronizing mechanism is called Program Clock Reference (PCR). The PCR may be a 48 bit counter that is sampled from a 27 MHz System Time Clock (STC) of the encoding device, such as encoder clock 12. A transport stream multiplexer (which may be included in encoder 8 or transmitter 10) can periodically insert a PCR value (i.e. an STC sample) in an extended TS packet header. For MPEG-2 transport streams, the PCR should be transmitted at least every 100 ms. The desired accuracy of the encoder STC may be 27 MHz±810 Hz, which may correspond to an accuracy of approximately 30 parts per million (ppm).

Synchronization of elementary streams within a program is enabled by Presentation Time Stamp (PTS) and Decoder Time Stamp (DTS) time stamps fields contained in the PES header. These timestamps may have 33 bits of resolution and may be derived from the STC of encoding device 4 (after being divided down to 90 kHz). These timestamps are used by decoding device 6 to determine when to decode the payload.

PTS indicates the time to display a decoded video frame or play a decoded audio frame. In some cases, audio output plays continuously according to the input bitstream and video is synchronized via the video PTS to audio. DTS indicates the time to decode a video frame, although this may only be applicable to bidirectional coded frames (B-frames). Transmission of the DTS may be avoided if the DTS is the same as PTS.

Typical clock synchronization mechanisms may use a voltage controlled oscillator (VCO) in the decoding device. A Voltage Controlled Crystal Oscillator (VCXO), for example, may adjust frequency according to the difference between the incoming clock reference (e.g., a PCR) and the local clock. A low pass filter may be used to reject transmission jitter. Heavily damped loops reject jitter well but have slower responses times. Loop lock-up time is reduced by setting the local clock to PCR whenever the first PCR of a new channel is received or whenever the PCR discontinuity indicator is set. As described herein, however, rather than use an adjustable clock, samples may be selectively added or dropped from the decoded output in order to compensate for any differences between encoder clock 12 and decoder clock 18. Such techniques are very useful for architectures that do not permit the source of the decoder clock to be adjusted.

If a particular if a decoding device does not permit the source of the decoder clock to be adjusted, it may be conventionally difficult or impossible to synchronize the decoder clock to the encoder clock using conventional closed loop mechanisms. In such cases, the techniques of this disclosure may be very useful. In accordance with this disclosure, clock drift (or other errors in the decoder clock relative to the encoder clock) can be addressed by selective insertion and removal of audio samples based on differences between PCR, the 27 MHz Transport Stream Interface (TSIF) clock and the audio decoder clock. The insertion and removal algorithm can be specifically designed to minimize any perceivable audio impact.

Figure 2:
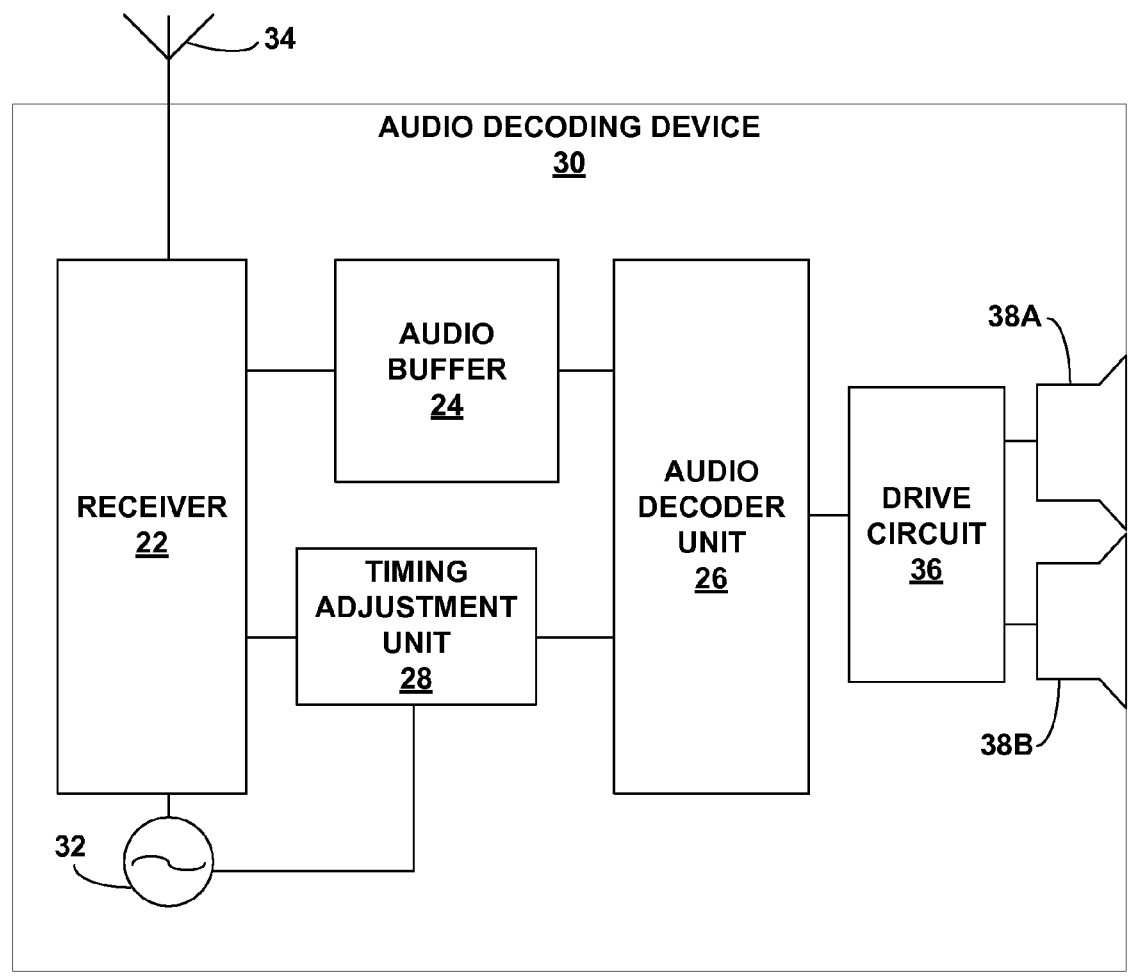
FIG. 2 is block diagram of an audio decoding device that may use the clock compensation techniques of this disclosure.

FIG. 2 is a block diagram of an exemplary audio decoding device 30, which may correspond to decoding device 6 of FIG. 1. Audio decoding device 30 includes a receiver 22, an antenna 34, a decoder clock 32, an audio buffer 24, a timing adjustment unit 28, an audio decoder unit 26, a drive circuit 36 and one or more speakers 38A and 38B. Additional components may also be included.

Receiver 22 receives audio information via a wireless protocol. Antenna 34 may facilitate the reception of wireless information via receiver 22. The received audio information includes first timing information associated with an encoder clock. For example, the first timing information may comprise time stamps periodically added by an encoding device using an encoding clock of the encoding device (such as encoding clock 12 of encoding device 4 in FIG. 1).

The received audio information is stored in audio buffer 24. Furthermore, upon receiving the audio information, which includes first timing information associated with an encoder clock, decoding clock 32 generates second timing information for the audio information. This second timing information may also comprise time stamps, but the time stamps may be different than those associated with the first timing information insofar as decoder clock 32 may be different than the encoder clock that added the first timing information. The first and second timing information is provided to timing adjustment unit 28.

Timing adjustment unit 28 estimates error in decoder clock 32 relative to the encoder clock that added the first timing information based on a difference between the first timing information and the second timing information. Audio decoder unit 26 then decodes the audio information to generate audio samples. Timing adjustment unit 28 can provide its error estimation to audio decoder unit 26 so that audio decoder unit 26 can adjust the number of the audio samples in decoded audio output to specifically compensate for the estimated error in decoder clock 32 relative to the encoder clock.

Audio decoder unit 26 decodes the audio information stored in audio buffer 24. This decoding results in a stream of digital audio samples. The digital audio samples may be delivered to drive circuit 36, which is used to drive one or more speakers 38A and 38B to deliver audio output to a user. Drive circuit 36 may include a digital-to-analog converter (DAC) that converts the digital audio samples into an analog signal. Drive circuit 36 may also include amplification elements to amplify the analog signal sufficient to drive speakers 38A and 38B to create audible sound.

In accordance with the teaching of this disclosure, audio decoder unit 26 adjusts the number of the audio samples in decoded audio output to specifically compensate for the estimated error in decoder clock 32 relative to the encoder clock. Timing adjustment unit 28 estimates error (sometimes referred to as "drift") in decoder clock 32 based on a difference between the first timing information and the second timing information. Timing adjustment unit 28 provides signals to audio decoder unit 26 indicative of this estimated error. Audio decoding unit then selectively inserts or removes samples from the decoded output in order to compensate for the error or drift in decoder clock 32. The time associated with the inserted or removed samples is sufficient to compensate for the error or drift in decoder clock 32.

For example, audio decoder unit 26 may adjust the number of audio samples by inserting additional audio samples into the decoded output to compensate for the decoder clock being slower than the encoder clock. The inserted audio samples may comprise silent audio samples, samples that are the same as previous or subsequent samples, interpolated audio samples that are interpolated between one or more previous and subsequent samples, or possibly other types of samples.

In some cases, audio decoder unit 26 may insert audio samples whenever a drift threshold is reached. In this case, when timing adjustment unit 28 determines that an accumulated error has been reached in decoder clock 32 relative to the encoder clock, audio decoder unit 26 should insert a new sample. In other cases, however, it may be more desirable to insert samples in a more intelligent and calculated manner. As an example, audio decoder unit 26 may estimate periods of substantial silence in the decoded audio output and preferentially insert samples during such periods of substantial silence. In this case, when timing adjustment unit 28 determines that an accumulated error has been reached in decoder clock 32 relative to the encoder clock, audio decoder unit 26 may insert silent audio samples specifically into estimated times of substantial silence in the decoded output. These additional steps may reduce the chance of generating any perceivable artifacts in the audio output. Decoder unit 26 could estimate times of substantial silence, for example, by examining the values associated digital samples to locate periods where the values would correspond to substantially silent output.

Audio decoder unit 26 may also adjust the number of audio samples removing one or more of the audio samples from the decoded output to compensate for decoder clock 32 being faster than the encoder clock. In this case, when timing adjustment unit 28 determines that an accumulated error has been reached in decoder clock 32 relative to the encoder clock, audio decoder unit 26 should remove a sample to compensate for this error. Like the sample insertion techniques, sample deletion may also be done in a more intelligent and calculated manner. As an example, audio decoder unit 26 may estimate periods of substantial silence in the decoded audio output and preferentially delete samples during such periods of substantial silence. In this case, when timing adjustment unit 28 determines that an accumulated error has been reached in decoder clock 32 relative to the encoder clock, audio decoder unit 26 may delete substantially silent audio samples specifically from these estimated times of substantial silence in the decoded output.

If there is no clock drift compensation, audio buffer 24 may overflow or under run. For example, audio buffer 24 can overflow when decoder clock 32 is slower than the encoder clock. Similarly, audio buffer 24 can under run when decoder clock 32 is faster than the encoder clock. One goal of the compensation techniques is to avoid overflow and under run by making small, generally unnoticeable corrections to the audio bitstream.

Referring again to the MPEG-2 TS example, the clock drift compensation algorithm performed by timing adjustment unit 28 may generate (1) estimates of the drift of PCR relative to TSIF and (2) the drift of DCLK (decoder clock 32) relative to TSIF. Timing adjustment unit 28 can subtract (2) from (1) to give an estimate of the drift of PCR relative to DCLK. The estimate of drift of PCR relative to DCLK is then used to determine when to command audio decoder unit 26 to insert or drop samples.

Whenever receiver 22 receives a new PCR it may tag the PCR sample with a TSIF timestamp (TTS) and notify timing adjustment unit 28. Upon receiving a PCR notification event, timing adjustment unit 28 reads and processes the latest PCR information. The PCR information read by timing adjustment unit 28 may comprise (1) a PCR value defined by the lower 32 bits of a 48 bit sample, (2) a TTS defined by 32 bits and including a TSIF timestamp as a 24 bit value contained in the 32 TTS bits, and (3) a reset value defined as a Boolean value, which may be set to true on the first PCR update after a PCR discontinuity (such as after a channel switch).

The action of time stamping the PCR may be performed by receiver 22 to reduce time stamp jitter. Furthermore, filtering may also be performed. As determined by the MPEG-2 Systems specification, timing adjustment unit 28 should receive PCR updates at least every 100 ms. Timing adjustment unit 28 may use the raw PCR/TTS data provided by receiver 22 to estimate the drift (D1) between PCR and TSIF as follows:

$$D1=(PCR_i-PCR_{i-1})/(TTS_i-TTS_{i-1}), i>1$$

$$D1=1, i=1$$

In this case, $PCR_i$ is the $i^{th}$ PCR update following a PCR discontinuity and $TTS_i$ is the TSIF timestamp associated $PCR_i$. D1 is filtered to remove jitter in PCR and TTS. When D1=1, PCR and TSIF are in sync. When D1 is greater than 1, PCR is ahead of TSIF. When D1 is less than 1, PCR is behind TSIF. PCR is discontinuous when adjacent PCR updates are not consistent with each other. When PCR is continuous, the difference between adjacent PCR values is approximately equal to the difference between PCR timestamps (allowing for drift and jitter). When PCR is discontinuous the PCR value jumps significantly ahead or behind the PCR value predicted by the time stamping clock. PCR discontinuity can be identified using a flag in the TS packet. Just in case the TS packet that contains the discontinuity flag is dropped, receiver 22 may check every PCR update for discontinuity. Upon detecting PCR discontinuity receiver 22 may notify timing adjustment unit 28 and decoder unit 26.

Audio decoder unit 26 may comprise a digital signal processor (DSP) that runs using a clock source that is not directly available to timing adjustment unit 28. Timing adjustment unit 28, for example, may comprise a software module executed by a different general purpose microprocessor. Audio decoder unit 26 may report the number of samples played and number of bytes consumed periodically at a time interval specified by timing adjustment unit 28 (typically once every 250 ms). Upon receiving an update from the audio decoder unit 26, timing adjustment unit 28 converts the samples played counter to a 27 MHz clock count and applies a TSIF timestamp. The conversion from samples played to 27 MHz clock count is:

$$DCLK_j=(N_j*27E6)/SF$$

wherein $DCLK_j$ is the number of 27 MHz increments in the $j^{th}$ feedback interval from audio decoder unit 26 and $N_j$ is the number of samples played in the $j^{th}$ feedback interval of audio decoder unit 26. SF is the audio sample frequency in Hz.

Timing adjustment unit 28 can use the time stamped decoder clock data to estimate drift (D2) between DCLK and TSIF as follows:

$$D2=(DCLK_j-DCLK_{j-1})/(TTS_j-TTS_{j-1}), j>1$$

$$D2=1, j=1$$

In this case, subscript j indicates the $j^{th}$ feedback from audio decoder unit 26 following a PCR discontinuity. Note that whenever a PCR discontinuity is detected both D1 and D2 estimation may be restarted. As with D1, D2 can be filtered to remove jitter in DCLK and TTS but not necessarily using the same time constant as D1. When D2=1, DCLK and TSIF are synchronized. When D2 is greater than 1, DCLK is ahead of TSIF. When D2 is less than 1, DCLK is behind TSIF.

The drift estimates D1 and D2 can be combined to give an estimate of the drift (D3) between PCR and the decoder clock as follows:

$$D3=D1-D2$$

Thus, subtracting D2 (DCLK/TSIF drift) from D1 (PCR/TSIF drift) effectively eliminates the common time stamping entity (TSIF). The following explains why subtraction is useful. If D1 and D2 are greater than 1 and approximately equal, then PCR and DCLK are both ahead of TSIF and the drift of PCR relative to DCLK is small. If D1 and D2 are less than 1 and approximately equal, then PCR and DCLK are both behind TSIF and the drift of PCR relative to DCLK is also small. If D1 is greater than 1 and D2 is less than 1, then PCR is ahead of TSIF and DCLK is behind TSIF and the drift of PCR relative to DCLK is potentially large.

As noted, the techniques described herein may use a sample insertion/removal threshold. As an example, timing adjustment unit 28 may use the estimate of PCR drift relative to the decoder clock drift (D3) to instruct audio decoder unit 26 to insert or drop PCM samples. If the audio sample frequency is SF Hz, one sample correction may take place whenever the clock error exceeds 1/SF seconds. Of course, preferential sample insertion and deletion may delay or accelerate the timing of when the samples are actually inserted or deleted based on estimation of properties of the audio output, such as estimation of times of substantial silence.

When D3 is greater than 1, one sample may be inserted every t seconds where:

$$t=1/(SF(D3-1))$$

When D3 is less than 1, one sample may be removed every t seconds where:

$$t=1/(SF(1-D3))$$

The time between corrections decreases as the sample frequency increases, and as the error between the encoder clock and the decoder clock increases. The worst case (i.e. smallest time interval between corrections) may be 1.68 seconds (one sample every 595 milliseconds). This may occur when sample frequency is at its maximum (e.g., 48 kHz), the encoder clock error is at its maximum (e.g., ±30 ppm), and the decoder clock error is at its maximum in the opposite sense relative to the encoder clock (e.g., ±5 ppm).

When timing adjustment unit 28 commands audio decoder unit 26 to remove a sample, audio decoder unit 26 skips a sample in the bitstream (as if it had detected an error). When timing adjustment unit 28 commands audio decoder unit 26 to insert a sample, audio decoder unit 26 may insert a silence sample into the bitstream, or possibly a sample that is identical to a previous sample or an interpolated sample that is interpolated between two successive samples. Following a sample removal, audio decoder unit 26 requests more data from audio buffer 24 later, helping to avoid buffer overflow. Following a sample insertion, audio decoder unit 26 requests more data from audio buffer 24 sooner, helping to avoid buffer under run.

The impact to the listener from sample drops or insertions may depend on the type of audio. More frequent single sample adjustments typically have less of an impact than less frequent multiple sample adjustments. For speech and most types of music, the worst case sample correction will not be noticed by the listener.

Figure 3:
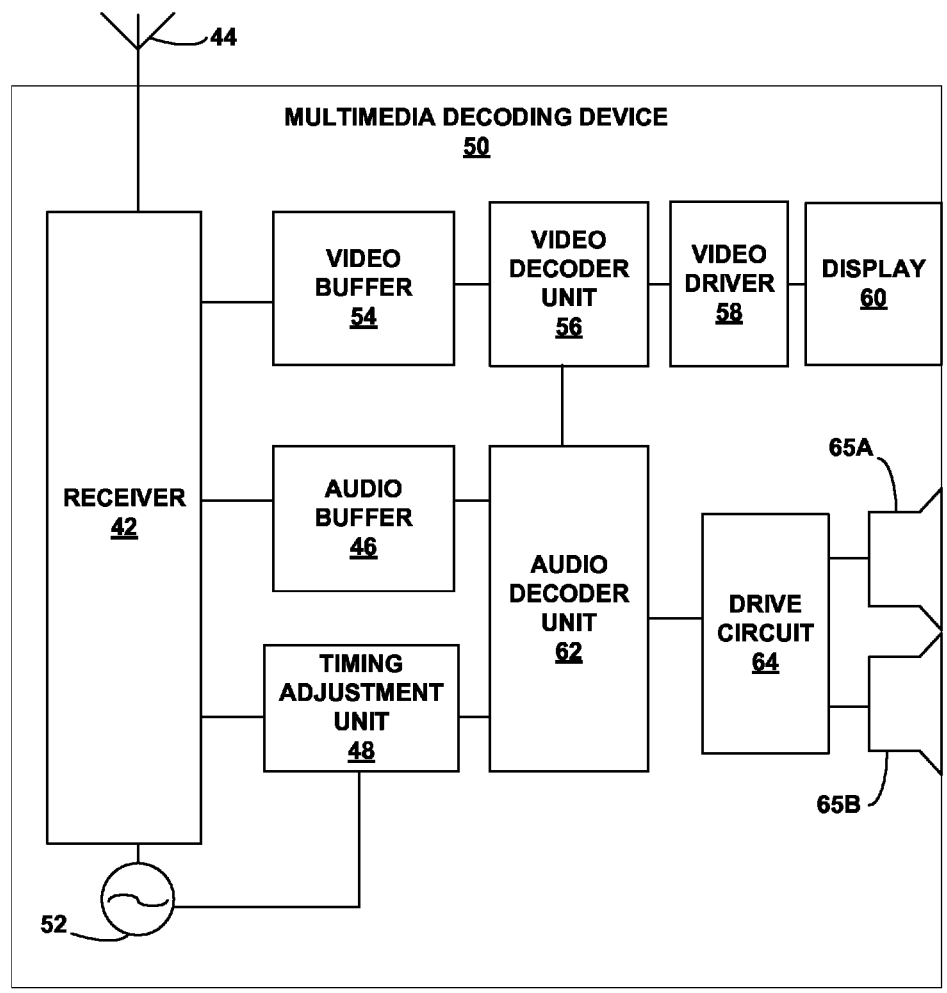
FIG. 3 is block diagram of a multimedia decoding device that may use the audio clock compensation techniques of this disclosure.

FIG. 3 is a block diagram illustrating a multimedia decoding device 50. In this case, device 50 decodes both audio information and video information. The audio decoding by device 50 is substantially similar to that of device 30 (FIG. 2). Receiver 42 receives multimedia information via a wireless protocol. The multimedia information includes both audio information and video information. Antenna 44 may facilitate the reception of wireless information via receiver 42.

With regard to audio information, device 50 of FIG. 3 operates in a similar manner to device 30 (FIG. 2). In this sense, the description above with regard to audio processing by device 30 (FIG. 3) applies to the audio processing performed by device 50. This description will not be repeated in discussing FIG. 3. Briefly, receiver 42 may operate like receiver 22, described above. Decoder clock 52, timing adjustment unit 48 and audio buffer 46 may operate like decoder clock 32, timing adjustment unit 28 and audio buffer 26, described above. Audio decoder unit 62, drive circuit 64 and speakers 65A and 65B may operate like audio decoder unit 26, drive circuit 36 and speakers 38A and 38B described above.

In accordance with this disclosure, video decoding is synchronized to the decoded audio output, which includes the adjusted number of audio samples. Video synchronization may be based on both samples played and bitstream bytes consumed. Audio sample drops and audio sample insertions do not have an adverse impact on audio/video synchronization.

In order to manage audio/video synchronization, audio decoder unit 62 may report to video decoder the number of samples played and number of bytes consumed. This reporting may occur periodically at a time interval specified by timing adjustment unit 48. Video decoder unit 56 can then perform video decoding in a manner defined by the audio decoding unit. This may achieve an added benefit of ensuring that video buffer 54 does not overrun or under run.

Video buffer stores coded video information. Video decoder unit 56 requests video information from video buffer 54, as needed, and decodes the frames of a video sequence. Again, this occurs in synchronization with the audio samples, which allows the video to be inherently timed correctly insofar as audio samples are adjusted to compensate for any errors in decoder clock 52 relative to an encoder clock. Decoded audio frames are then provided to video driver 58, which drives display 60 to present a video sequence to a user. The video sequence is synchronized with the corresponding audio output of speakers 65A and 65B.

Figure 4:
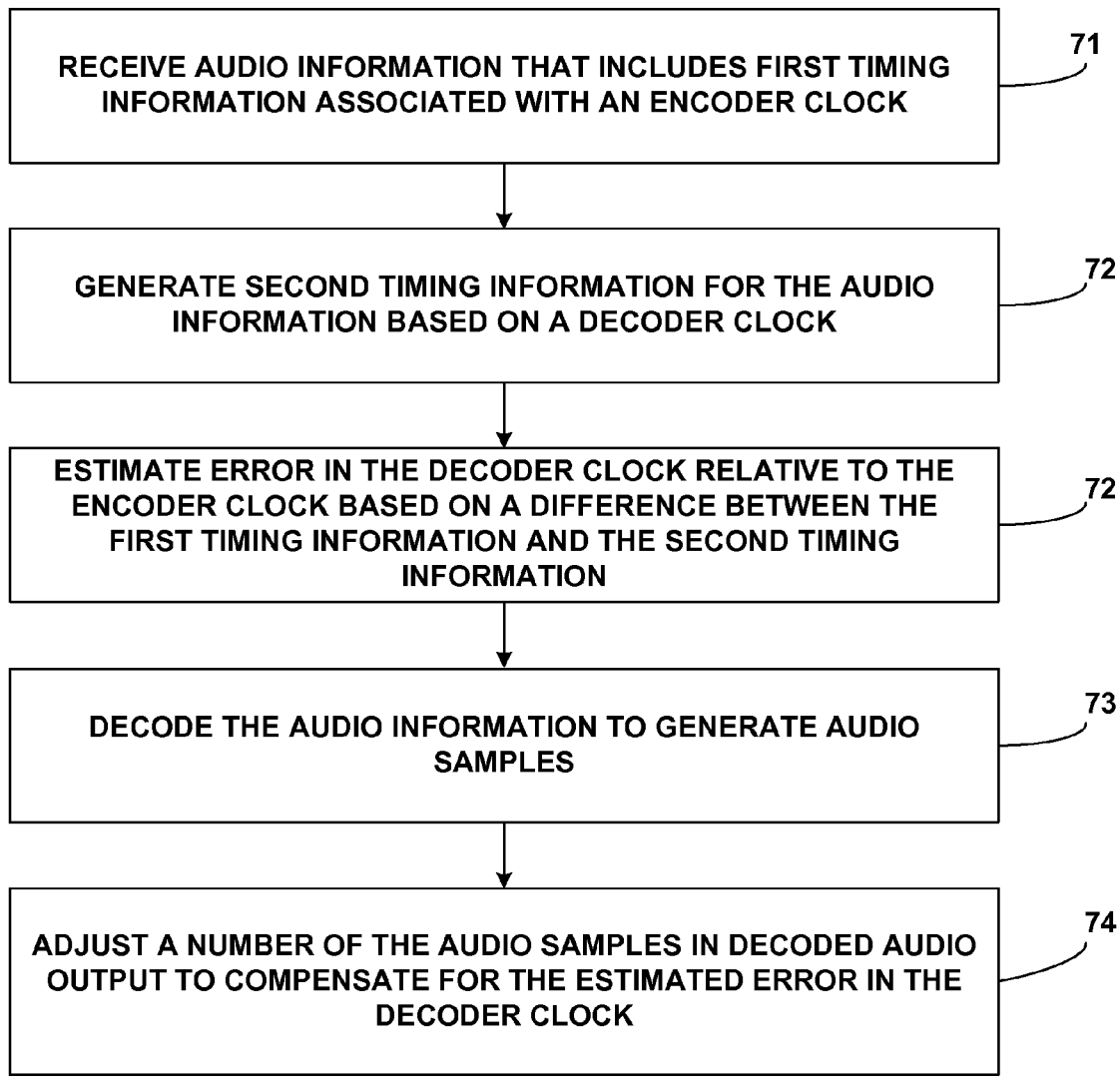
FIG. 4 is a flow diagram illustrating a technique in which audio samples are adjusted to compensate for error in a clock of an audio decoding device relative to a clock of an audio encoding device.

FIG. 4 is a flow diagram illustrating techniques in which audio samples are adjusted to compensate for error in a clock of an audio decoding device relative to a clock of an audio encoding device. FIG. 4 will be described from the perspective of audio decoding device 30 illustrated in FIG. 2. As shown in FIG. 4, receiver 22 of audio decoding device 30 receives audio information that includes first timing information associated with an encoder clock (71). Audio decoding device 30 generates second timing information for the audio information based on decoder clock 32 (72).

Timing adjustment unit 28 estimates error in decoder clock 32 relative to the encoder clock based on a difference between the first timing information and the second timing information (73). Audio decoder unit 26 decodes the audio information to generate audio samples (74). In doing so, audio decoder unit 26 adjusts a number of the audio samples in decoded audio output to compensate for the estimated error in the decoder clock (75). This adjustment may involve inserting or deleting samples, as needed, to compensate for the estimated error in the decoder clock relative to the encoder clock used by an encoding device to encode the audio information. One sample is typically inserted or deleted in successive increments of time in order to continuously adjust for clock drift.

Figure 5:
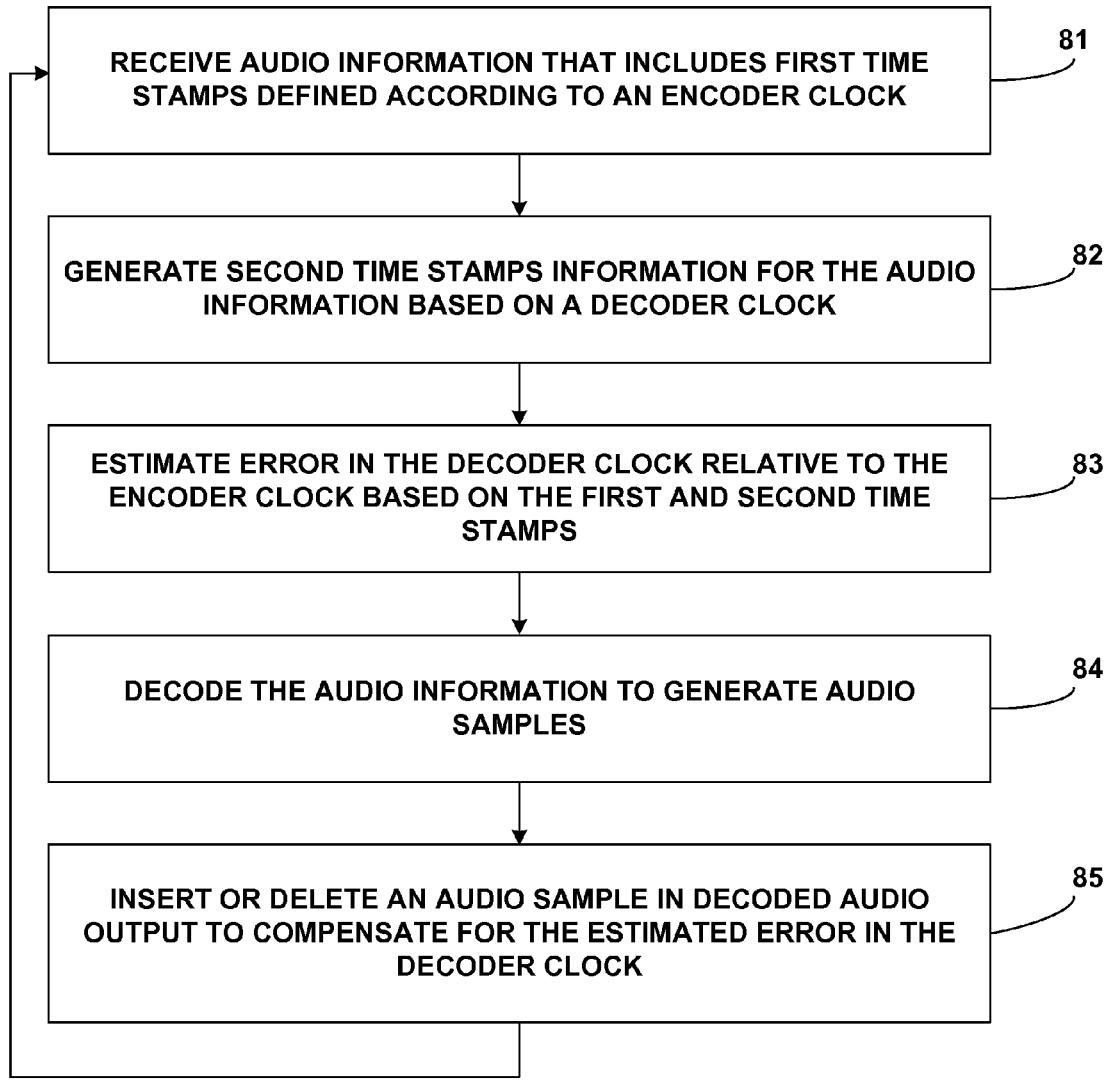
FIG. 5 is another flow diagram illustrating techniques in which audio samples are adjusted to compensate for error in a clock of an audio decoding device relative to a clock of an audio encoding device.

FIG. 5 is another flow diagram illustrating techniques in which audio samples are adjusted to compensate for error in a clock of an audio decoding device relative to a clock of an audio encoding device. FIG. 5 will be described from the perspective of audio decoding device 30 illustrated in FIG. 2. As shown in FIG. 5, receiver 22 of audio decoding device 30 receives audio information that includes first time stamps defined according to an encoder clock (81). Audio decoding device 30 generates second time stamps for the audio information based on decoder clock 32 (82).

Timing adjustment unit 28 estimates error in decoder clock 32 relative to the encoder clock based on the first and second time stamps (83). Audio decoder unit 26 decodes the audio information to generate audio samples (84). In doing so, audio decoder unit 26 inserts or deletes an audio sample in decoded audio output to compensate for the estimated error in the decoder clock (85). This continues (as illustrated by the loop in FIG. 5) such that one sample is inserted or deleted in successive increments of time in order to continuously adjust for clock drift. Each inserted or deleted sample compensates for drift that occurs over a discrete time increment. The time increments are typically relatively steady, such that samples are inserted or deleted in a steady periodic manner unless the clock drift changes, e.g., due to temperature variations at the encoder clock, the decoder clock, or both. If clock drift changes, the time increments associated with sample insertion or deletion may likewise change.

A number of techniques and examples have been described. The described techniques may be implemented in hardware, software, firmware, or any combination thereof. If implemented in software, the techniques described herein may be embodied in a computer readable medium comprising instructions that upon execution in a device to perform one or more of the techniques described above. For example, the instructions, upon execution, may cause the device to receive audio information that includes first timing information associated with an encoder clock, generate second timing information for the audio information based on a decoder clock, estimate error in the decoder clock relative to the encoder clock based on a difference between the first timing information and the second timing information, decode the audio information to generate audio samples, and adjust a number of the audio samples in decoded audio output to compensate for the estimated error in the decoder clock.

The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The instructions may be executed by one or more processors or other machines, such as one or more digital signal processors (DSPs), general purpose microprocessors, one or more application specific integrated circuits (ASICs), one or more field programmable logic arrays (FPGAs), or other equivalent integrated or discrete logic circuitry. In some embodiments, the functionality described herein may be provided within dedicated software modules or hardware units configured for encoding and decoding audio or multimedia information, or incorporated in a combined multimedia encoder-decoder (CODEC).

These and other examples are within the scope of the following claims.

The invention claimed is:

1. A method comprising:
  receiving audio information that includes first timing information associated with an encoder clock;
  generating second timing information for the audio information based on a decoder clock;
  estimating a drift error in the decoder clock relative to the encoder clock based on a calculated difference of time between the first timing information and the second timing information;
  accumulating the drift error in the decoder clock relative to the encoder clock, the accumulated drift error corresponding to an uncorrected drift error in the audio information;
  decoding the audio information to generate decoded audio samples; and
  determining if the accumulated drift error in the decoder clock relative to the encoder clock reaches a drift threshold, and if so, adjusting a number of the audio samples in decoded audio output to compensate for the accumulated drift error in the decoder clock without re-synchronizing the decoder clock to the encoder clock, wherein adjusting the number of audio samples comprises inserting additional audio samples into the decoded audio output to compensate for the decoder clock being slower than the encoder clock, and wherein inserting the additional audio samples comprises estimating times of substantial silence in the decoded audio output and inserting the silent audio samples in the times of substantial silence.

2. The method of claim 1, wherein inserting the additional audio samples comprises inserting interpolated audio samples.

3. The method of claim 1, wherein adjusting the number of audio samples comprises removing one or more of the audio samples from the decoded audio output to compensate for the decoder clock being faster than the encoder clock.

4. The method of claim 3, wherein removing one or more of the audio samples comprises removing substantially silent audio samples.

5. The method of claim 3, wherein removing one or more of the audio samples comprises:
  estimating times of substantial silence in the decoded audio output; and
  removing the silent audio samples from the times of substantial silence.

6. The method of claim 1, wherein the audio information comprises encoded audio information within audio packets.

7. The method of claim 6, wherein the audio packets comply with a motion pictures expert group 2 (MPEG-2) Transport Stream (TS) protocol.

8. The method of claim 1, further comprising:
  synchronizing video decoding to the decoded audio output that includes the adjusted number of audio samples.

9. A device comprising:
  a receiver that receives audio information including first timing information associated with an encoder clock;
  a decoder clock that generates second timing information for the audio information;
  a timing adjustment unit that:
    estimates a drift error in the decoder clock relative to the encoder clock based on a calculated difference of time between the first timing information and the second timing information,
    accumulates the drift error in the decoder clock relative to the encoder clock, the accumulated drift error corresponding to an uncorrected drift error in the audio information, and
    determines if the accumulated drift error in the decoder clock relative to the encoder clock reaches a drift threshold; and
  a decoder unit that decodes the audio information to generate decoded audio samples, wherein when the accumulated drift error in the decoder clock relative to the encoder clock reaches the drift threshold the decoder unit adjusts a number of the audio samples in decoded audio output to compensate for the accumulated drift error in the decoder clock without re-synchronizing the decoder clock to the encoder clock, wherein the decoder unit inserts additional audio samples into the decoded audio output to compensate for the decoder clock being slower than the encoder clock, and wherein the decoder unit estimates times of substantial silence in the decoded audio output and inserts the silent audio samples in the times of substantial silence.

10. The device of claim 9, wherein the decoder unit inserts interpolated audio samples into the decoded audio output.

11. The device of claim 9, wherein the decoder unit removes one or more of the audio samples from the decoded audio output to compensate for the decoder clock being faster than the encoder clock.

12. The device of claim 11, wherein the decoder unit removes substantially silent audio samples from the decoded audio output.

13. The device of claim 11, wherein the decoder unit:
estimates times of substantial silence in the decoded audio output; and
removes the silent audio samples from the times of substantial silence.

14. The device of claim 9, wherein the audio information comprises encoded audio information within audio packets.

15. The device of claim 14, wherein the audio packets comply with a motion pictures expert group 2 (MPEG-2) Transport Stream (TS) protocol.

16. The device of claim 9, further comprising:
a video decoder unit that synchronizes video decoding to the decoded audio output that includes the adjusted number of audio samples.

17. A non-transitory computer readable medium comprising instructions that upon execution in a device cause the device to:
receive audio information that includes first timing information associated with an encoder clock;
generate second timing information for the audio information based on a decoder clock;
estimate a drift error in the decoder clock relative to the encoder clock based on a calculated difference of time between the first timing information and the second timing information;
accumulate the drift error in the decoder clock relative to the encoder clock, the accumulated drift error corresponding to an uncorrected drift error in the audio information;
decode the audio information to generate decoded audio samples; and
determine if the accumulated error in the decoder clock relative to the encoder clock reaches a drift threshold, and if so, adjust a number of the audio samples in decoded audio output to compensate for the accumulated drift error in the decoder clock without re-synchronizing the decoder clock to the encoder clock, wherein the instructions cause the device to insert additional audio samples into the decoded audio output to compensate for the decoder clock being slower than the encoder clock, and wherein the instructions cause the device to estimate times of substantial silence in the decoded audio output and insert the silent audio samples in the times of substantial silence.

18. The non-transitory computer readable medium of claim 17, wherein the instructions cause the device to insert interpolated audio samples into the decoded audio output.

19. The non-transitory computer readable medium of claim 17, wherein the instructions cause the device to remove one or more of the audio samples from the decoded audio output to compensate for the decoder clock being faster than the encoder clock.

20. The non-transitory computer readable medium of claim 19, wherein the instructions cause the device to remove substantially silent audio samples from the decoded audio output.

21. The non-transitory computer readable medium of claim 19, wherein the instructions cause the device to:
estimate times of substantial silence in the decoded audio output; and
remove the silent audio samples from the times of substantial silence.

22. The non-transitory computer readable medium of claim 17, wherein the audio information comprises encoded audio information within audio packets.

23. The non-transitory computer readable medium of claim 22, wherein the audio packets comply with a motion pictures expert group 2 (MPEG-2) Transport Stream (TS) protocol.

24. The non-transitory computer readable medium of claim 17, wherein the instructions cause the device to synchronize video decoding to the decoded audio output that includes the adjusted number of audio samples.

25. A device comprising:
means for receiving audio information that includes first timing information associated with an encoder clock;
means for generating second timing information for the audio information based on a decoder clock;
means for estimating a drift error in the decoder clock relative to the encoder clock based on a calculated difference of time between the first timing information and the second timing information;
means for accumulating the drift error in the decoder clock relative to the encoder clock, the accumulated drift error corresponding to an uncorrected drift error in the audio information;
means for decoding the audio information to generate decoded audio samples;
means for determining if the accumulated drift error in the decoder clock relative to the encoder clock reaches a drift threshold; and
means for adjusting a number of the audio samples in decoded audio output to compensate for the accumulated drift error in the decoder clock, without re-synchronizing the decoder clock to the encoder clock, when the accumulated drift error in the decoder clock relative to the encoder clock reaches the drift threshold, wherein the means for adjusting the number of audio samples inserts additional audio samples into the decoded audio output to compensate for the decoder clock being slower than the encoder clock, and wherein the means for adjusting the number of audio samples estimates times of substantial silence in the decoded audio output and inserts the silent audio samples in the times of substantial silence.

26. The device of claim 25, wherein the means for adjusting the number of audio samples inserts interpolated audio samples into the decoded audio output.

27. The device of claim 25, wherein the means for adjusting the number of audio samples removes one or more of the audio samples from the decoded audio output to compensate for the decoder clock being faster than the encoder clock.

28. The device of claim 27, wherein the means for adjusting the number of audio samples removes substantially silent audio samples from the decoded audio output.

29. The device of claim 27, wherein the means for adjusting the number of audio samples:
estimates times of substantial silence in the decoded audio output; and
removes the silent audio samples from the times of substantial silence.

30. The device of claim 25, wherein the audio information comprises encoded audio information within audio packets.

31. The device of claim 30, wherein the audio packets comply with a motion pictures expert group 2 (MPEG-2) Transport Stream (TS) protocol.

32. The device of claim 25, further comprising:
means for synchronizing video decoding to the decoded audio output that includes the adjusted number of audio samples.

33. The method of claim 1, wherein the first timing information includes a first time stamp generated based on an encoder clock, and wherein the second timing information includes a second time stamp generated based on a decoder clock.

34. The device of claim 9, wherein the first timing information includes a first time stamp generated based on an encoder clock, and wherein the second timing information includes a second time stamp generated based on a decoder clock.

35. The non-transitory computer readable medium of claim 17, wherein the first timing information includes a first time stamp generated based on an encoder clock, and wherein the second timing information includes a second time stamp generated based on a decoder clock.

36. The device of claim 25, wherein the first timing information includes a first time stamp generated based on an encoder clock, and wherein the second timing information includes a second time stamp generated based on a decoder clock.

37. A method comprising:
 receiving audio information that includes first timing information associated with an encoder clock, wherein the first timing information comprises first time stamps added by an encoding device to an encoded stream of audio packets included in the audio information;
 generating second timing information comprising second time stamps for the audio information based on a decoder clock;
 estimating a drift error in the decoder clock relative to the encoder clock based on a calculated difference of time between the first timing information and the second timing information, the estimated drift error corresponding to an uncorrected drift error in the audio information;
 decoding the audio information to generate decoded audio samples; and
 adjusting a number of the audio samples in decoded audio output to compensate for the estimated drift error in the decoder clock, wherein adjusting the number of audio samples comprises inserting additional audio samples into the decoded audio output to compensate for the decoder clock being slower than the encoder clock, and wherein inserting the additional audio samples comprises estimating times of substantial silence in the decoded audio output and inserting the silent audio samples in the times of substantial silence.

38. A device comprising:
 a receiver that receives audio information that includes first timing information associated with an encoder clock, wherein the first timing information comprises first time stamps added by an encoding device to an encoded stream of audio packets included in the audio information;
 a decoder clock that generates second timing information comprising second time stamps for the audio information;
 a timing adjustment unit that estimates a drift error in the decoder clock relative to the encoder clock based on a calculated difference of time between the first timing information and the second timing information, the estimated drift error corresponding to an uncorrected drift error in the audio information; and
 a decoder unit that decodes the audio information to generate decoded audio samples, and adjusts a number of the audio samples in decoded audio output to compensate for the estimated drift error in the decoder clock, wherein the decoder unit inserts additional audio samples into the decoded audio output to compensate for the decoder clock being slower than the encoder clock, and wherein the decoder unit estimates times of substantial silence in the decoded audio output and inserts the silent audio samples in the times of substantial silence.

* * * * *